Sept. 19, 1933.     C. W. LAUFLE     1,927,442
TRUSSED STRUCTURE AND METHOD AND SHAPES THEREFOR
Filed April 4, 1932     6 Sheets-Sheet 1

INVENTOR
Charles W. Laufle,
BY Justin W. Macklin
ATTORNEY

Sept. 19, 1933.   C. W. LAUFLE   1,927,442
TRUSSED STRUCTURE AND METHOD AND SHAPES THEREFOR
Filed April 4, 1932   6 Sheets-Sheet 2

Sept. 19, 1933.  C. W. LAUFLE  1,927,442
TRUSSED STRUCTURE AND METHOD AND SHAPES THEREFOR
Filed April 4, 1932   6 Sheets-Sheet 4
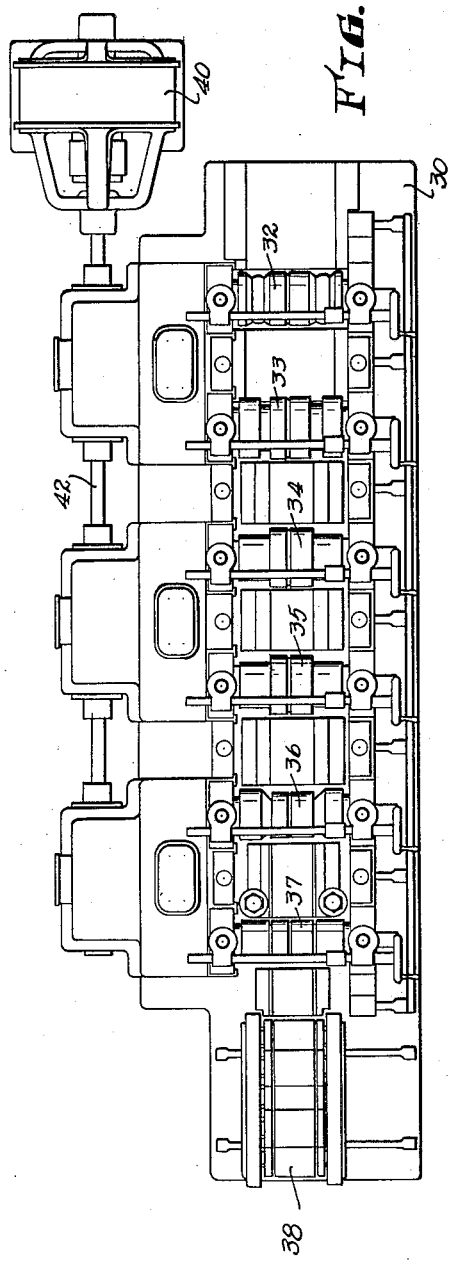
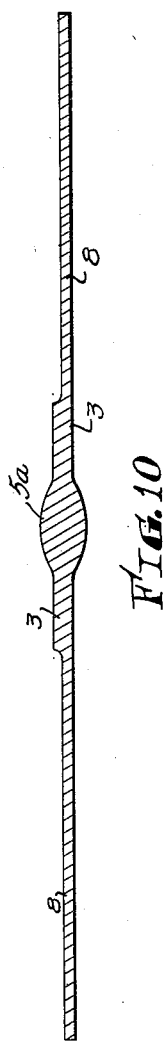
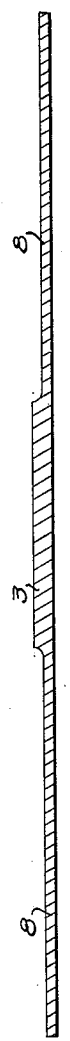
INVENTOR
Charles W Laufle.
BY Justin W Macklin
ATTORNEY Sept. 19, 1933.     C. W. LAUFLE     1,927,442
TRUSSED STRUCTURE AND METHOD AND SHAPES THEREFOR
Filed April 4, 1932     6 Sheets-Sheet 5
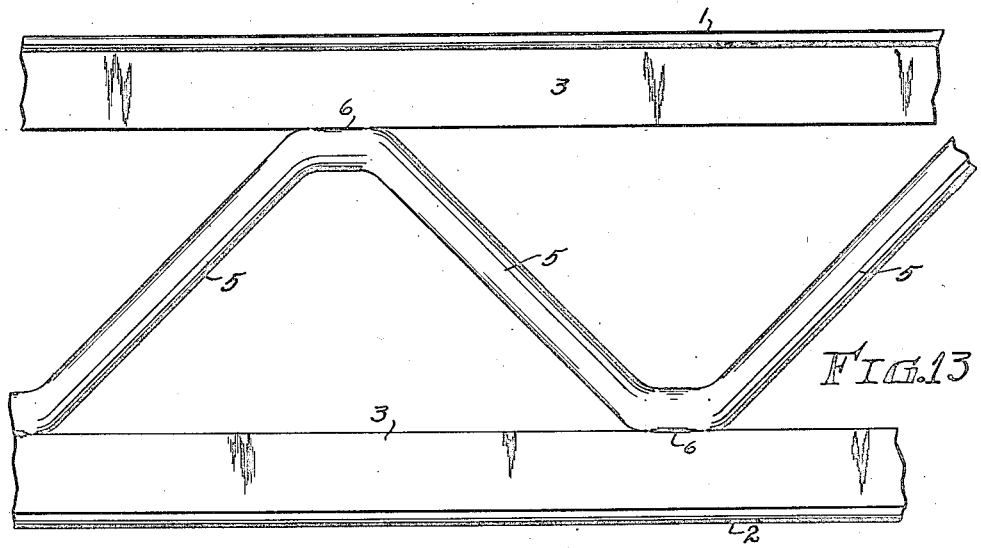
FIG.13
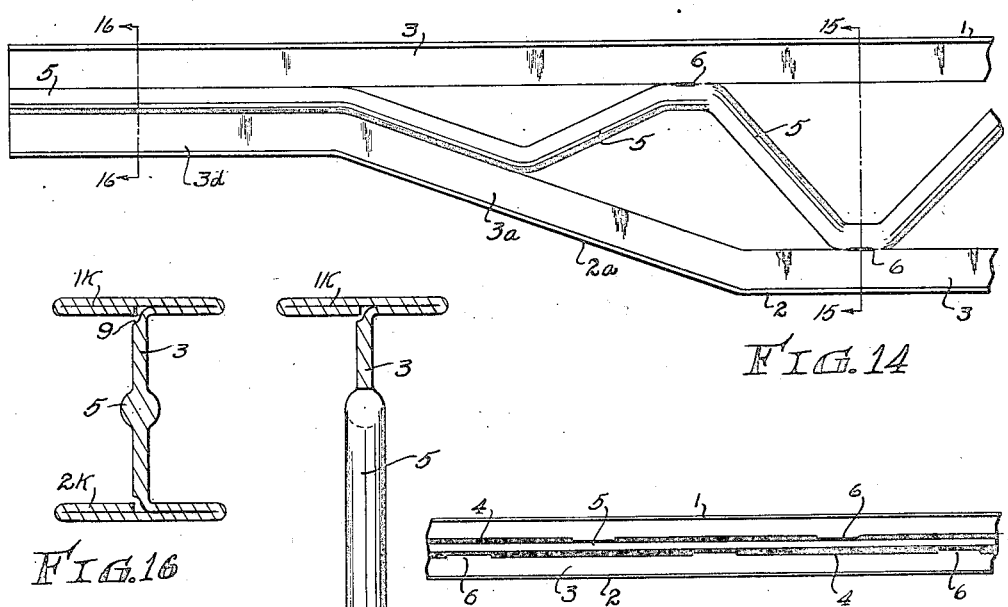
FIG.14
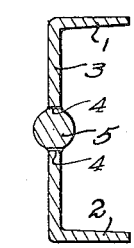
FIG.16
FIG.17
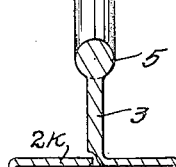
FIG.15
FIG.12
INVENTOR
Charles W. Laufle,
BY Justin W. Macklin
ATTORNEY Sept. 19, 1933.   C. W. LAUFLE   1,927,442
TRUSSED STRUCTURE AND METHOD AND SHAPES THEREFOR
Filed April 4, 1932   6 Sheets-Sheet 6

INVENTOR
Charles W. Laufle,
BY Justin W. Macklin,
ATTORNEY

Patented Sept. 19, 1933

1,927,442

UNITED STATES PATENT OFFICE 1,927,442

TRUSSED STRUCTURE AND METHOD AND SHAPES THEREFOR

Charles W. Laufle, Lakewood, Ohio

Application April 4, 1932. Serial No. 602,881

13 Claims. (Cl. 189—37)

The present invention relates to frame structures of the type having longitudinal chord members in the form of T-beams, I-beams and the like connected together by truss members in the form of latticed open webs.

The invention is primarily concerned with frame structures of this general character, in which the trussed or open web portion is integrally-formed with the longitudinally extending chord members which form the sides or edges of the structural members.

Frame structures of this character are generally formed from structural shapes provided with longitudinal chord members and a connecting split web portion adapted to be expanded, thereby resulting in an open truss web effect. It has been found that frame structures of this nature in general are too light and do not possess sufficient strength in proportion to their weight. In structures of this type as formerly made, it has been the general practice to make the web portion connecting the two chord members of uniform thickness throughout, then slitting it alternately on either side of an intermediary portion and thereafter expanding it. To obtain the necessary strength, the intermediary portion of the web forming the truss members must necessarily have its width large with respect to its thickness. This is necessary, in order that its cross sectional area shall be sufficient to give the desired strength. When the expanding operation takes place, these truss member are bent sharply at the points where they join either chord member. Because of the relatively wide dimension of these truss members, the outer fibres at the point of bending are stressed very high, and should the angle that the truss members make with the chord member separated therefrom be very large, fracture at the bending point frequently results. This type of structure is therefore limited to the condition where the truss members are of either relatively narrow width with respect to their thickness and therefore weak, or to a small angle between the truss members and the chord member separated therefrom, such angle usually being less than thirty degrees.

The principal object of the present invention is to provide an expanded frame structure of the type above referred to, which will overcome the objections just mentioned, and which will possess materially greater strength than has heretofore been attained, and toward this end the invention contemplates the provision of an expanded structure in which the intervening truss members are materially thicker after expanding of the structure, even though the angle referred to be relatively large.

Yet another object of the invention is to provide a novel structural shape adapted to be expanded into a finished frame structure, and which may be manufactured by the usual rolling process at a minimum cost, yet which will at the same time provide a practical structure.

Toward these ends the present invention contemplates the provision of a pair of flanged longitudinal chord members which may, for example, be channel or T-shaped in cross section with interconnecting web portions provided with an intervening thickened longitudinal rib intermediate the web portion. The web portion is provided with slits on opposite sides of the thickened longitudinal rib to accommodate expansion of the structure. The slits are staggered on opposite sides of the thickened rib portion and the adjacent ends of the staggered slits overlap each other so that when the structure is expanded the thickened longitudinal rib forms an open trussed web.

Heretofore in the manufacture of such frame structures the I-beams have been split and a zigzag rod has been welded at separated staggered points to the opposite chord members formed by splitting the I-beams. By the present invention the welding operation has been eliminated, and by expanding a metal structure manufactured in accordance with the principles of the present invention, an integral completed frame structure is formed with connections between the longitudinal cord members that are stronger than connections which are ordinarily formed by welding.

Furthermore, a more uniform structure is provided by virtue of the integral joining of the various parts. In addition to this, the interconnecting truss portion of the structure may be formed of a predetermined size before expansion of the structure to allow for a reasonable stretch during the expanding operation, in order that the desired strength of the truss portion may be attained in the finished product.

Further specific objects include the arrangement and design of sections which may provide for a wide variety of variations in the formation of the chord members to meet various conditions, from the shape of mere channel angle irons to that of having one chord for example provided with nailing strip retaining flanges.

Other variations provide for still greater lightness than that of the use of standard I-beam section, and which permit of the making of the I-beam folded at outer portions of the webs to form the channels or I-beams.

Other objects and advantages of the invention, not at this time more particularly enumerated, will become more readily apparent as the nature of the invention is better understood, and the same consists in the novel construction, combination, and arrangement of parts shown in the accompanying six sheets of drawings forming a part of this specification and in which Fig. 1 is a sectional view taken transversely through a structural shape adapted to subsequently be expanded to form an integral frame structure. In this view a single central rib is disclosed and is adapted to form a central open connecting truss member when the shape is expanded.

Figs. 10 and 11 are sectional views similar to Fig. 9 showing modified forms of blanks that may be employed in forming additional forms of structural shapes adapted subsequently to be expanded.

Fig. 12 is a fragmentary side elevation of the structural shape shown in Fig. 1 before the shape has been expanded, and showing a plurality of overlapping slits which prepare the shape for the expanding operation.

Fig. 13 is a fragmentary side elevation of a frame structure manufactured in accordance with the principles of the present invention.

Fig. 14 is a fragmentary side elevation similar to Fig. 13 of a modified form of frame structure, having an unexpanded portion associated therewith.

Fig. 15 is a sectional view taken substantially along the line 15—15 of Fig. 14.

Fig. 16 is a sectional view taken substantially along the line 16—16 of Fig. 14.

Fig. 17 is a transverse sectional view taken through a structural shape adapted to be subsequently expanded into a frame structure having channel shaped longitudinal chord members.

Fig. 21 is a top plan view of a machine for folding the blanks shown in Figs. 9, 10 and 11 into the structural shapes shown in Figs. 7, 8, 15, 16 or 17.

Figure 25:
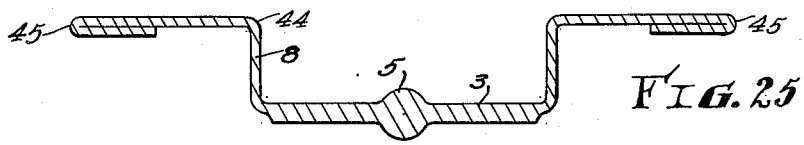
Figure 26:
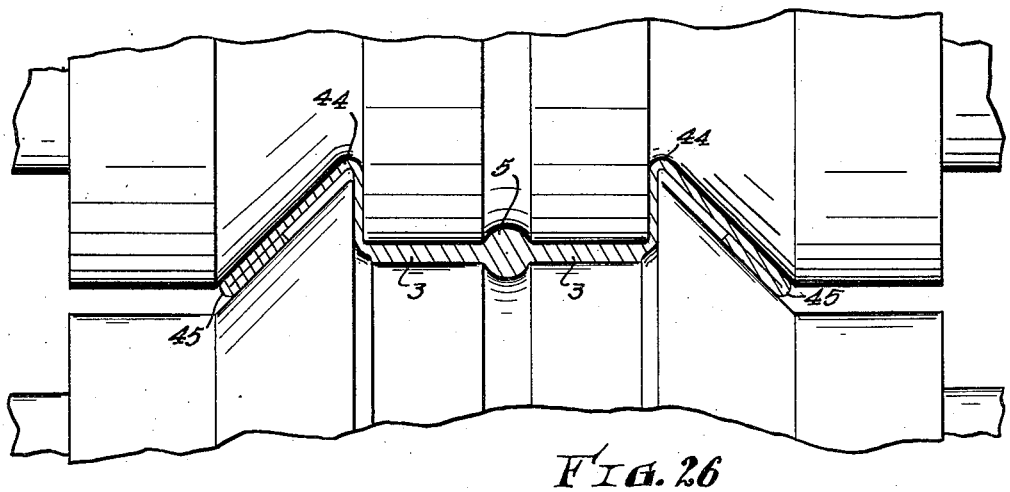

Fig. 25 is a transverse sectional view taken through a blank at a late stage in the forming thereof into a structural shape; and Fig. 26 is a fragmentary side elevation of a pair of forming rolls operating upon a blank just prior to the last forming operation, which converts the blank into a structural shape adapted to be expanded to form a frame structure in accordance with the principles of the present invention.

Figure 1:
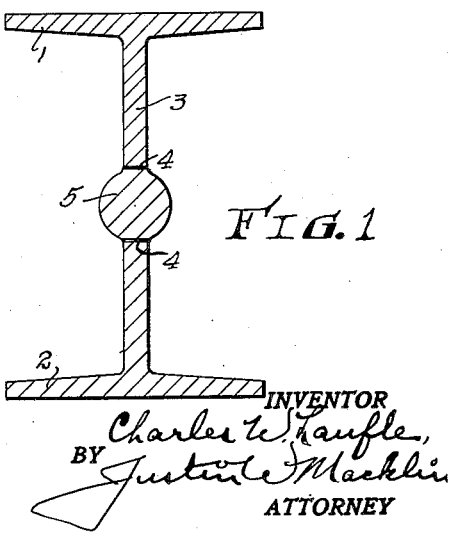

Assuming a blank of the I-beam channel shape of Fig. 1 is to be formed into the beam of Fig. 13, the flanges 1 and 2 are left intact, while the web 3 is slit by suitable means, preferably by shearing rolls, as indicated by lines 4 at either side of the central rib 5, later to become the lattice or truss part of the expanded beam.

The slits 4 are shown in Fig. 12. These slits are staggered at either side of the rib and the ends of adjacent staggered slits overlap, leaving bonds or connections between the rib 5 and web 3 as at 6. The channel having been slit, is then passed through suitable expanding means such as a wedge die (not shown) closely embracing the web and flanges, causing the flanges 1 and 2 to be separated, thus stretching the web 5 to the shape shown in Fig. 13 and forming the open lattice work effect. If it is desired to leave the end portions of the beam unexpanded as shown at 3d in Fig. 14, this may be done by having the wedge expanding die so shaped that one side is in alignment with the flange 1 of one chord member 3, while the other side of the wedge is sloped with the shape of the portion on the angle shown in Fig. 14 at 2a and 3a, with the result that the drop beam effect is formed at the end of the beam. The provision of the unexpanded portion 3d forming the narrower section is very desirable for many building conditions.

In the expansion of the parallel chord members 3 which includes webs at either side of the slits 4 and the flanges 1 and 2, these members are uniformly separated a predetermined distance. The open or lattice work beam with the central rib 5 may be considerably wider than the blank or original form of the I-beam before the slitting and expansion. The size and shape of the rib 5 may be determined to provide the desired strength of the open lattice beam, and the distance or amount of integral bond at 6 between the ends of aligned slits 4 is preferably such that there shall be no tendency to fracture the metal during the combined bending and pulling, resulting from the expanding operation.

Obviously during this expanding operation the rib 5 becomes elongated so that it stretches the beam to its diagonal position and this stretch is imparted to a certain extent to the integral attachment portion of the web at 6. This however affords no difficulties, inasmuch as the selection of the size or cross sectional area of the rib 5 is made with this in mind, that is, the rib 5 of the formed blank in the example given, of Fig. 1, is slightly larger in cross sectional area than the section of the finished expanded beam after the stretching operation.

The web 3 and flanges may be any usual standard form. It is not necessary to make them exceptionally thick or thin, and it will be noted in the finished product the integral connection between the webs and the truss rib 5 will always be uniform. Its strength is thus capable of being predetermined and the product is superior to that in which the central truss portion is in the form of a rod that is bent and welded in position between the cord members.

Figure 2:
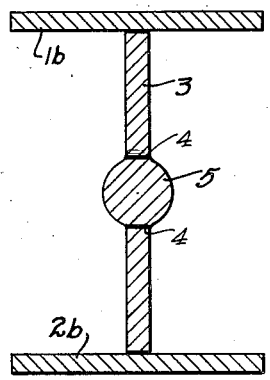
Fig. 2 is a sectional view taken transversely through another form of structural shape and showing a pair of longitudinal chord members welded or otherwise secured to a centrally webbed portion adapted to be subsequently expanded.
Figure 3:
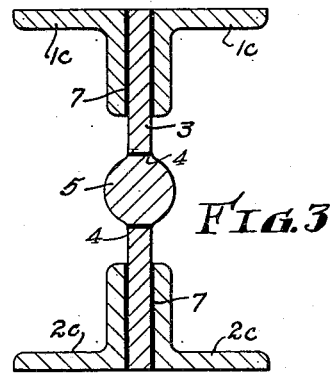
Figs. 3, 4 and 5 are sectional views taken transversely through modified forms of unexpanded structural shapes.
Figure 4:
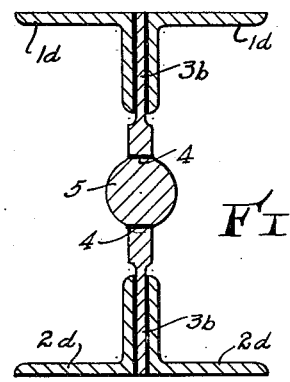

The forms of Figs. 2, 3 and 4 comprise a web section of a predetermined width and to which the flanges forming a part of the chord members are secured by welding or the like. This form of the invention has desirable characteristics in that the rolling of the web blank is simplified, and the flange portions may be made thinner than it is practicable to form in a rolled shape. Having predetermined the nature of the web to be employed, strips of flat bar angles or other desired cross sectional shapes may be selected and secured to the blank web stock.

In Fig. 2 is shown one of the simplest forms in which the rib 5 is formed substantially centrally of the otherwise flat bar forming the portions 3, and to the outer edges of which are secured as by welding thin flat strips 1b and 2b to form an I-beam section from which the beam shown in Figs. 13 and 14 may be formed.

In Fig. 3 the web section is substantially the same as that of Fig. 2, except that it may be slightly wider and instead of the flat bar 16, pairs of angle iron sections 1c and 2c are welded along the surfaces indicated at 7, to form in effect an I-beam section.

A slightly lighter section shown in Fig. 4 is similar to the section shown in Fig. 3 except that the web portion is thinned at 3b from the edges to a short distance from the central rib 5 and lighter angle strips 1d and 2d are welded to the thin sections 3b.

Figure 5:
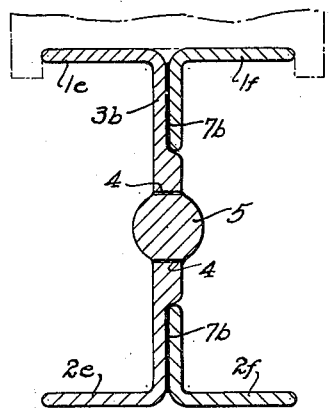

In Fig. 5 a web section similar to Fig. 4 is shown, except that the thin portions of the original web section 3b are extended and are formed by rolling into channel flanges 1e and 2e, while an I-beam section may be created by welding a pair of angle sections 1f and 2f along the surfaces 7b.

Figure 6:
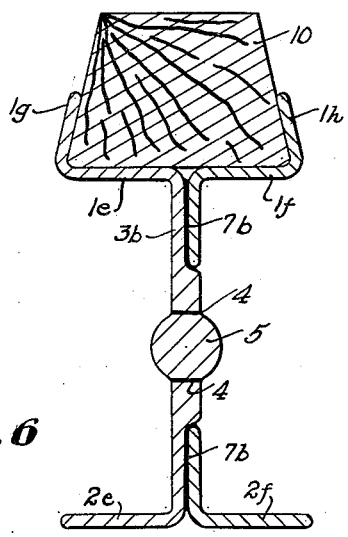
Fig. 6 is a sectional view taken transversely through yet another modified form of structural shape adapted to be subsequently expanded and showing a nailing strip associated therewith.

Fig. 6 discloses an arrangement of parts similar to Fig. 5 in which means is provided for attachment of a wood nailing strip. In this form of the invention, the web portion 3b is extended laterally at 1c and is bent upwardly and sloped inwardly at 1g to provide a retaining flange for the nailing strip 10. An angle strip 1f is welded at 7b to the portion 3b and is provided with an inwardly sloping retaining flange 1h. The strip 10 is wedged shaped and is securely held in position between the flanges 1g and 1h.

The structural shapes shown in Figs. 2, 3, 4, 5 and 6 are adapted to be expanded by the process outlined in connection with Fig. 1.

Figure 7:
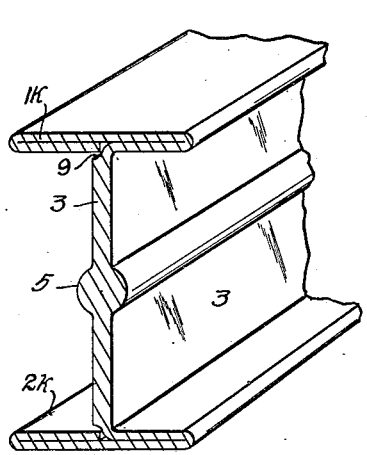
Figs. 7 and 8 are perspective views of a section of a structural shape adapted to subsequently be expanded and showing the longitudinal chord members as being formed of thin sheet material folded upon itself.
Figure 8:
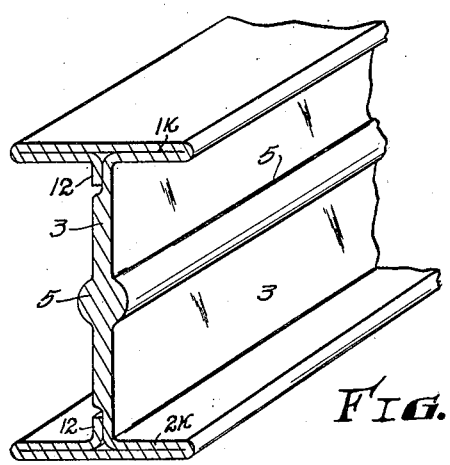

In Fig. 10 a different shape of central truss rib 5a is shown in the form of an oval suitable for some purposes, as in the formation of beams of the general nature shown in Figs. 7 and 8. The blank of Fig. 11 has its central web 3 of uniform thickness throughout, while the portions 8 are also of uniform thickness. In this latter case parallel slits are formed at suitable distances for the expansion of the central web portion as has been done heretofore in I-beam channel structures.

Figure 9:
Fig. 9 is a sectional view taken transversely through a blank from which the structural form shown in Figs. 7 and 8 are made.
Figure 22:
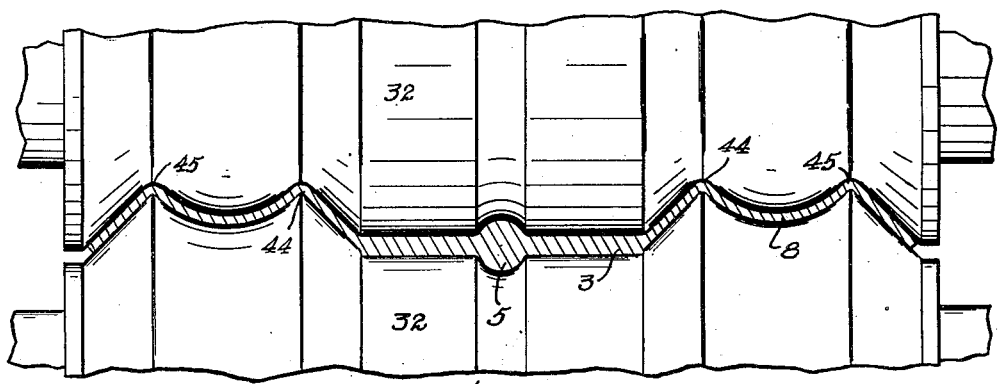
Fig. 22 is a fragmentary side elevation of a pair of forming rolls employed in connection with the folding operation of the present invention and showing a blank being treated thereby.
Figure 23:
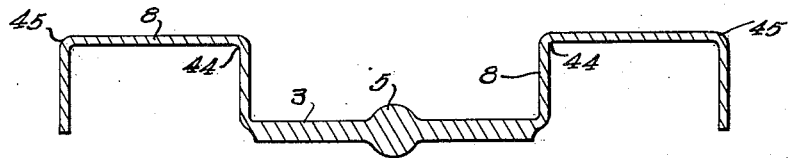
Fig. 23 is a sectional view taken transversely through a blank during an intermediate stage in the forming operation.

Blanks such as are shown in Figs. 9, 10 and 11 may be formed into I-beam shapes or other structural shapes, as desired, by suitable rolling processes. I have illustrated the form of Fig. 9 as formed into an I-beam section illustrated in Figs. 7 and 8. Referring to these latter figures at either side of the truss rib 5, the web 3 is of the usual thickness for an I-beam of the proportion shown, and this thickness extends for approximately the full width between the side flanges. Beyond this width the thinned portion of approximately one-half the thickness of the web portion 3 extends for a width sufficient to be folded into the flange. This portion is designated at 8 in Fig. 9 and it will be noted that this is a single integral and approximately flat strip stock blank, which may be passed through the rolls of a rolling machine, such as shown in Fig. 21. The different shapes appearing in Figs. 22, 23 and 24 and finally that of the folded flanges of the finished I-beam shown in Fig. 7, may then be presented to shearing knives (not shown) and be slit to provide the slits 4 in the forms previously described. The shapes are then expanded into beams such as are shown in Figs. 13 or 14.

The flanged portions 1k and 2k (Figs. 7 and 8) preferably have their extreme ends coming just under the shoulders between the web portion 3 and the folds of the thinner part indicated at 9. In Fig. 8 the extreme edges of the thinned portions are shown as having an extra fold and the thickened portion of the web portion is slightly narrower, to accommodate this fold 12 inturned to lie against the thinned portion to be secured by a suitable welding operation.

Figure 18:
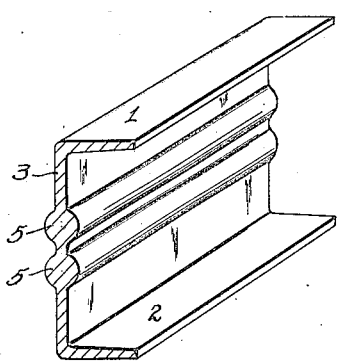
Fig. 18 is a perspective view of a structural shaped section adapted to subsequently be expanded to form an integral frame structure. In this view a pair of central ribs are disclosed which are adapted to form a central open connecting truss portion when the shape is expanded.
Figure 18A:
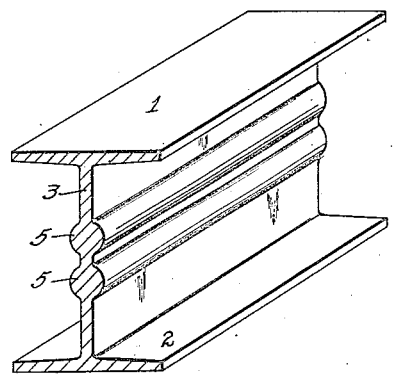
Fig. 18a is a perspective view similar to Fig. 18, showing a slightly modified form of longitudinal chord member associated with the structural shape.
Figure 19:
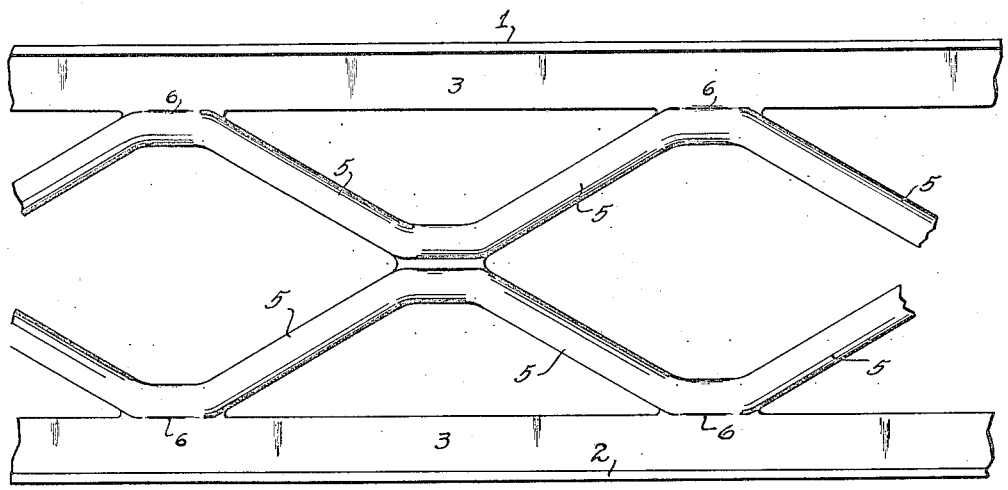
Fig. 19 is a fragmentary side elevation of a frame structure formed from the structural shape shown in Fig. 18a after the expanding operation has been performed.
Figure 20:
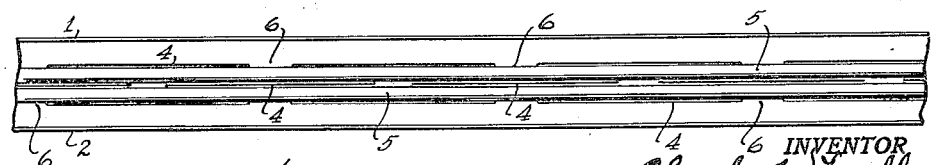
Fig. 20 is a fragmentary side elevation of the structural shape shown in Fig. 18a after the slitting operation has been performed to permit expansion.

Lattice or truss work for wider beams, in proportion to the given blank and for certain given weights of section, may be made by providing a plurality of longitudinal truss ribs 5, shown in Figs. 18 and 18a. In Figure 18 the channel beam section is provided with the web 3 of the usual thickness. This web is provided with a pair of truss ribs 5 spaced apart a suitable distance. Flanges 1 and 2 form the parallel chord or running side portions of the beam. An I-beam of similar arrangements is shown in Fig. 18a. The webs of both of the forms shown in these two figures are slit as shown at 4 in Fig. 20. It will be noted that the slits 4 are staggered, those outside the two truss ribs being offset with relation to the slits 4 between the two truss ribs, the uncut distance being determined to leave a connection of sufficient length as in the form of the invention previously described. This slit may be made as in any of the forms of the invention previously described. The beam is then passed through an expanding wedge die (not shown) and is subjected to any suitable lateral expanding device which bends and stretches the truss beams 5 to the form shown in Fig. 19, leaving alternate diamond and triangular shaped openings, which gives a corresponding strength to a beam of materially greater width for a given section without unduly stretching the truss ribs 5.

In the method of treating blanks such as shown in Figs. 10 and 11, the machine shown in Fig. 21 comprises a suitable base portion 30 having suitable bearings which support a series of pairs of rolls 32, 33, 34, 35, 36 and 37, which form and fold the sides of the strips and pass them to finishing and straightening rolls 38. 40 indicates a suitable source of power such as a motor connected with the shaft 42 suitably geared to the rollers 32, 33, 34, 35, 36 and 37 for driving the same and causing the blank strip to pass through the machine, thus forming the channel strip by successive stages.

Figure 24:
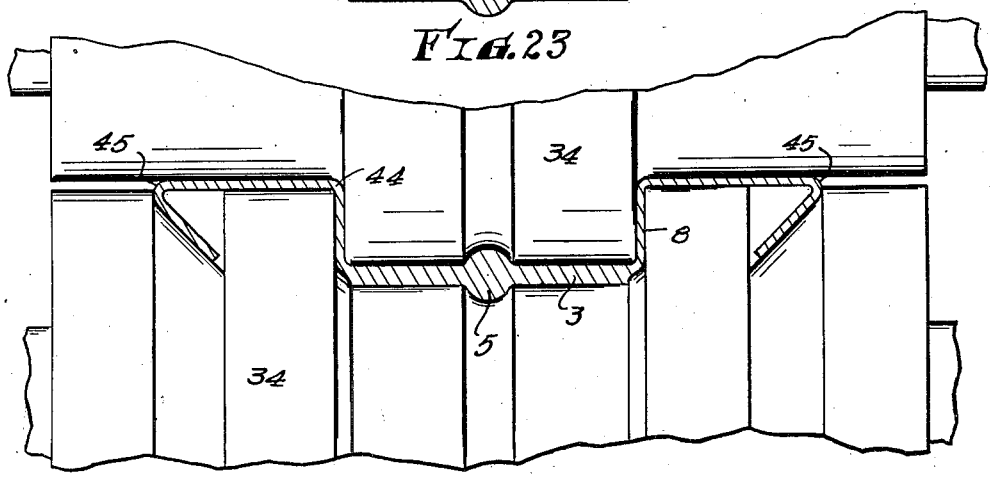
Fig. 24 is a fragmentary side elevation of another pair of forming rolls similar to the forming rolls shown in Fig. 22 at a later stage in the forming operation.

In the forming operation the rolls 32 first bend each of the side portions 8 along two lines of fold designated 44 and 45, leaving flat parts and an intermediate curved part 8 as shown. The next pair of rollers effect the lines of fold shown in Fig. 23. The next pair of rollers turn the outer portions inwardly from the adjacent fold lines 45 as shown in Fig. 24. A subsequent pair of rollers bend these outer portions flat against the next adjacent inner surfaces as shown in Fig. 25 and the next pair of rollers as shown in Fig. 26 start the final fold along the inner fold lines 44. Finishing rolls bring the blank to the shape shown in Fig. 7. By a similar treatment the blank may be brought to the form shown in Fig. 8.

From the foregoing description it will be seen that I have provided structural shapes which are manufactured from blank forms for forming lattice work beams, which may be made by well known forming processes, affording no special problems to the rolling mill manufacturer. It will also be seen that these various forms may be treated by slitting and expanding to provide truss beams having chord portions and thickened truss rib portions integrally connected therewith, and which when expanded constitute comparatively lightweight beams of greater strength in proportion to the weight than has hitherto been attained.

It will be further seen that my process in the final embodiment of my invention is capable of many variations using various blank forms from which the beams are to be made, and that by the use of mere slitting and expanding operations, channels, I-beams and the like of various shapes may be formed.

It will be seen that by the provision of an integral truss rib, the open web will be of uniform strength throughout, and inasmuch as variations which may occur in welding or which may result from undue stretching have been eliminated, a superior article will result.

Having thus described my invention, I claim:

1. A structural member of rolled shape adapted to be expanded into a frame structure of truss form, said member having a web portion and having a longitudinally extending thickened rib provided with slits at its longitudinal edges, leaving staggered integral bonds between the rib and web portion, whereby upon expansion the thickened rib becomes extended and assumes diagonal positions in the finished structure.

2. A flanged structural form adapted to be expanded into an integral structural shape having webbed portions between the flanges and a thickened longitudinal rib between the webbed portions severed by longitudinal slits from said portions, leaving spaced integral bond connections with the web.

3. An expanded metal beam formed of a rolled structural flange shape, having an intermediate web and side flanges and a thickened longitudinal rib portion intermediate the web severed therefrom by longitudinally spaced slits adjacent to the ribs and at either side thereof to leave spaced apart bonds alternately joining the web portion and ribbed portion, and expanded to separate the webbed portion and to form the rib portion into diagonal struts.

4. An integral structural member having a flange and web portion and a thickened rib in the web portion substantially parallel to the flange, said rib being sheared for a portion of its length from the web portion to permit of its being extended by bending and stretching away from the web portion by gripping the web to form lattice or truss struts integrally joined to the web.

5. A method of making lattice beams for structural members, comprising forming a rolled shape of uniform cross section throughout and having thin side portions for a material distance of its width inwardly from each edge thereof, a central thickened portion forming a web and a still thicker portion forming a longitudinal rib, slitting the web adjacent the rib leaving oppositely alternate separated bond connections, and then expanding the beam while gripping the shoulders at the sides of the rib to cause the rib to form elongated diagonal struts.

6. A method of forming a truss I-beam or the like, comprising forming a rolled strip having a central longitudinally extending thickened rib and web portions at either side thereof of uniform thickness and still thinner portions for a material distance from the web portions to the edges of the strip, rolling the blank thus formed to bend the thinner side portions in a series of bends to form an I-beam, the fold extending first in one direction and then closed substantially an equal distance from the side of the web and inwardly to the web and thereafter slitting the intermediate web portion adjacent the rib portion and expanding the same while gripping the shoulders of the rib arising from the web to cause the rib to form diagonal trussed struts.

7. An integral structural member of rolled shape adapted to be expanded into a frame structure of truss form, said member having parallel chord portions adapted to present side flanges in the frame structure and a plurality of parallel medial longitudinal thickened ribs sheared from the web to permit expansion of the rolled shape whereby the thickened ribs upon expansion will form integral struts between the chord members.

8. An integral structural member having a flange and web portion and a plurality of thickened ribs in the web portion substantially parallel to the flange, said ribs being sheared for a portion of their length from the web portion and between the ribs leaving staggered integral bonds to permit of their being gripped and extended by bending and stretching away from the web portion to form lattice or truss struts integrally joined to the web.

9. An integral load bearing frame structure expanded into a truss form from a rolled shape, having longitudinal chord members provided with web portions, and integral diagonal truss members connecting said web portions, said truss members having a substantially circular cross section, whereby the greater part of the section is adjacent the neutral axis while bending during expansion and subjected to relatively low stresses thereby.

10. An integral load bearing frame structure expanded into a truss form from a rolled shape, having longitudinal chord members provided with web portions, and integral diagonal truss members connecting said web portions, said truss members having a substantially circular cross section, whereby they are free of lateral distortion during expansion of the frame structure.

11. An integral load bearing frame structure expanded into a truss form from a rolled shape, having longitudinal chord members provided with web portions, and integral diagonal truss members connecting said web portions, said truss members having a substantially circular cross section, whereby the truss members may be bent sharply on expansion of the frame structure without fracture at the bends.

12. An integral load bearing frame structure expanded into a truss form from a rolled shape, having longitudinal chord members provided with web portions, and integral diagonal truss members connecting said web portions, said truss members having a substantially circular cross section, whereby the truss member may be bent upon expansion through an angle greater than 30° without fracture.

13. An integral load bearing frame structure expanded into a truss form from a rolled shape, having longitudinal chord members provided with web portions, and integral diagonal truss members connecting said web portions, said truss members having a substantially circular cross section, whereby the truss member may be bent upon expansion through an angle of 45° without fracture.

CHARLES W. LAUFLE.